Aug. 1, 1950  L. GRIMM ET AL  2,517,479
LUMINOUS SIGNALING FLOAT
Filed Dec. 10, 1947
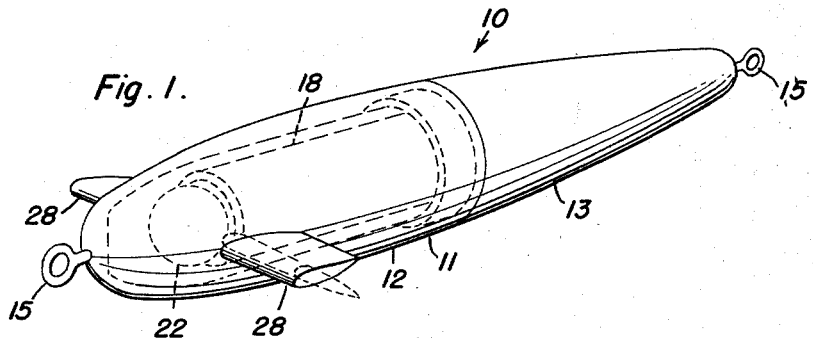
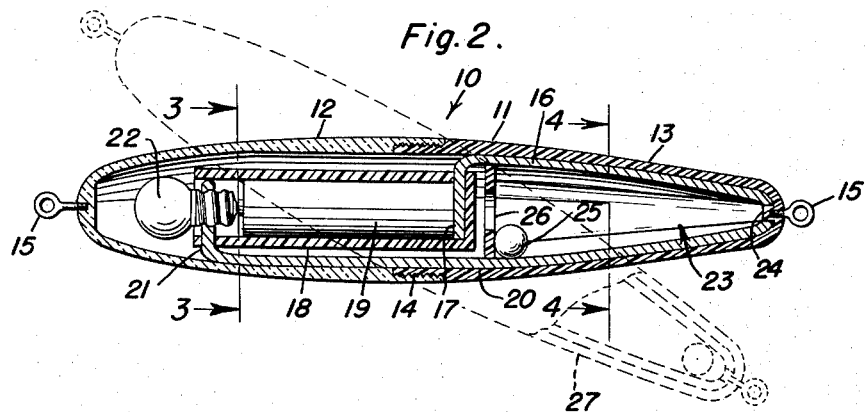
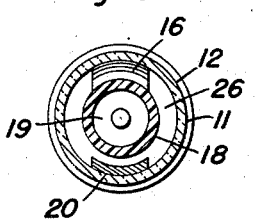
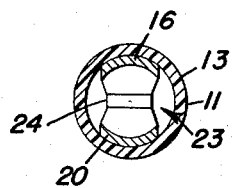
Lafe Grimm
Hugh J. Moyer
INVENTORS Patented Aug. 1, 1950

2,517,479

UNITED STATES PATENT OFFICE 2,517,479

LUMINOUS SIGNALING FLOAT

Lafe Grimm, Decatur, and Hugh J. Moyer, Berne, Ind.

Application December 10, 1947, Serial No. 790,730

2 Claims. (Cl. 43—17)

This invention relates to new and useful improvements and structural refinements in fishing floats, and the principal object of the invention is to provide a device of the character herein described, which may be referred to as a luminous signalling float, the same embodying in its construction an electric lamp, a battery, as well as a switch for automatically completing the electric circuit between the battery and the lamp whenever normal buoyancy of the float is affected by the biting of the fish.

A further object of the invention is to provide a luminous signalling float, which, by virtue of the construction above outlined, is of course, particularly suitable for night fishing, inasmuch as the fisherman's attention will be visually directed to the fact that a fish is biting or has been caught.

Another object of the invention is to provide a luminous signalling float which is simple in construction, convenient in operation, and which will not easily become damaged.

An additional object of the invention is to provide a luminous signalling float which will readily lend itself to economical manufacture and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a perspective view of the invention.

Figure 2 is a longitudinal cross-sectional view thereof.

Figure 3 is a cross-sectional view taken substantially in the plane of the line 3—3 of Figure 2, and Figure 4 is a cross-sectional view, taken substantially in the plane of the line 4—4 in Figure 2.

Like characters of reference are employed to designate like parts in the specification and throughout the several views.

Referring now to the accompanying drawings in detail, the invention consists of a luminous signalling float designated generally by the reference character 10, the same embodying in its construction a buoyant housing 11 formed from transparent material and including a pair of complementary sections 12, 13, which are separably connected together by means of complementarily screw-threaded portions, as indicated at 14.

It will be observed that the housing or body 11 is of an elongated configuration, and that the end portions thereof are provided with suitable eyes 15, whereby the float, as a whole, may be conveniently attached to the fishing line (not shown).

A bracket 16 is provided in the housing 11, this bracket including an angulated portion 17 to which is rigidly secured a casing 18 accommodating a dry battery 19. The casing 18 is preferably formed from insulating material, and a further bracket 20 is provided in the housing 11 in diametrically opposed relation with respect to the bracket 16, the bracket 20 including also an angulated portion 21 which serves in the manner of a socket for an electric lamp 22. As will be readily understood, this lamp engages one terminal of the battery 19, so that when circuit between the brackets 16, 20 (which is normally broken) is completed, the lamp 22 will be energized.

The section 13 of the housing 11 constitutes what may be referred to as a switch chamber 23, and the brackets 16, 20 extend into this chamber, and the extremities thereof are separated by means of an insulator 24.

In effect, the brackets 16, 20 constitute what may be referred to as an open switch, the latter also including a metallic ball 25 which is freely movable in the chamber 23.

When the invention is placed in use, the entire float is normally disposed in a substantially horizontal position on the water, in which the switch ball 25 occupies a position adjacent a partition 26 which separates the chamber 23 from the remaining portion of the housing 11, as is best illustrated in Figure 2.

However, under such circumstances, the circuit between the brackets 16, 20 is broken, and no current is delivered to the lamp 22 from the battery 19.

When the fish bites, the entire float is, of course, urged into an inclined position, substantially as shown by the phantom lines 27 during which occurrence the switch ball 25 gravitates toward the lower end of the housing and contacts the brackets 16, 20. This contact, of course, establishes electrical connection between the two brackets, and as a result, the lamp 22 becomes energized by the battery 19, thereby indicating to the fisherman that a fish is biting or has been caught.

If desired, the section 12 of the housing 11 may be provided with a pair of laterally projecting stabilizers 28, which will materially assist in normally maintaining the entire float in a substantially horizontal position and also, will prevent the float from rotating on its own longitudinal axis.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. In a luminous signalling float, the combination of an elongated housing formed from insulating material and including a tapered end portion, a transverse partition separating the tapered end portion from the remaining portion of the housing and defining a tapered switch chamber in said end portion, a battery and a lamp positioned in the housing exteriorly of said chamber, a pair of conductor straps in circuit with said battery and lamp respectively and extending through said partition into said chamber, portions of said straps in said chamber being convergent and spaced to provide a switch gap between the convergent ends thereof, and a spherical contact element movable in said chamber and engageable with convergent end portions of said straps to electrically bridge the latter and complete an electric circuit through said battery and lamp, intermediate portions of said straps in said chamber being spaced apart more than the diameter of said element whereby the stated electric circuit is automatically interrupted when said element is disposed remotely from said gap.

2. The device as defined in claim 1 wherein said straps are transversely concaved to provide runways for said element.

LAFE GRIMM.
HUGH J. MOYER.

REFERENCES CITED

The following references are of record in the file of this patent:

UNITED STATES PATENTS

| Number | Name | Date |
|---|---|---|
| 2,001,109 | Petrie | May 14, 1935 |
| 2,280,457 | Sutcliffe | Apr. 21, 1942 |
| 2,448,681 | Nutter | Sept. 7, 1948 |
| 2,464,309 | Harshman | Mar. 15, 1949 |